United States Patent [19]

Plessner

[11] 4,424,795
[45] Jan. 10, 1984

[54] HEATER BOX FOR USE AS AN IMPROVED PORTABLE SOLDERING FURNACE UNIT

[76] Inventor: Jac A. Plessner, 7842 Clearfield Ave., Panorama City, Calif. 91402

[21] Appl. No.: 265,413

[22] Filed: Dec. 18, 1981

[51] Int. Cl.³ .............................................. F24C 3/00
[52] U.S. Cl. .................................... 126/237; 126/239; 228/57; 431/344
[58] Field of Search ............... 126/237, 236, 238, 239, 126/229, 38; 228/56, 57; 219/227, 229; 431/344

[56] References Cited

U.S. PATENT DOCUMENTS

| | | | |
|---|---|---|---|
| 1,680,776 | 8/1928 | Fahlberg | 126/239 |
| 2,861,562 | 11/1958 | Ross et al. | 126/38 |
| 3,724,444 | 4/1973 | Varona | 126/237 |
| 4,340,029 | 7/1982 | Kelly, Jr. | 126/237 |

Primary Examiner—Samuel Scott
Assistant Examiner—Randall L. Green
Attorney, Agent, or Firm—W. Edward Johansen

[57] ABSTRACT

The present invention is a heater box for use in combination with a heating unit in an improved portable soldering furnace which includes a casing having a base and a hood which covers the base. The base has a first compartment wherein a soldering iron, having a shaft, a handle and a soldering head, and a second compartment. The heating unit includes a cylindrical bottle, which holds a flammable gas under pressure, a valve, which is mechanically and fluidly coupled to the cylindrical bottle, and a burner tube, which is mechanically and fluidly coupled to the valve. The heating unit is disposed in the second compartment of the base.

The heater box includes a heating chamber having a back wall, a bottom wall and a pair of side walls and being open at both its front and its top and it is disposed in the second compartment of the base and mechanically coupled to the heating unit. The heater box also includes an insulating apparatus for insulating the heating unit from the heating chamber. The insulating apparatus includes a first insulating chamber having a back wall, a pair of side walls, a top which is pivotally coupled to the pair of side walls adjacent to the back wall and a front wall which encloses the bottom half of the first insulating chamber and having the heating chamber disposed therein. The insulating apparatus also includes a second insulating chamber having a back wall, a pair of side walls and a front wall which partially encloses the front of the second insulating chamber and having the first insulating chamber disposed therein.

6 Claims, 4 Drawing Figures

HEATER BOX FOR USE AS AN IMPROVED PORTABLE SOLDERING FURNACE UNIT

BACKGROUND OF THE INVENTION

1. Field of the Invention

The present invention relates to soldering furnaces and more particularly to portable soldering furnaces.

2. Description of the Prior Art

U.S. Pat. No. 2,327,677, entitled Means for Clamping Furnaces to Torches, issued to Ernest A. Starbuck on Aug. 24, 1943, teaches a combination which includes a burner tube or nozzle of a torch and a furnace which is adapted to be clamped with respect thereto and which includes a pair of spaced abutments extending from the furnace. The burner tube lies between the abutments in spaced relation to the same. A wedging member lies at each side of the burner tube to abut the same and to engage an adjacent abutment. The combination also includes a shifting mechanism for shifting each member to wedge it between its adjacent abutment and the burner tube.

U.S. Pat. No. 1,680,776, entitled Soldering Furnace, issued to Ernest David Fahlberg on Aug. 14, 1928, teaches a soldering furnace which includes a body which is open at the top and front and which is closed at the bottom by an integral fuel container. The furnace also includes a filling opening in the front end of the fuel container, a sick burner in the form of a tube on the other end of the fuel container and a combined tool holder and burner hood which is movably mounted in the body over the fuel container. The soldering furnace further includes a cover which has a depending plate at its front end wherein the cover closes the body.

U.S. Pat. No. 2,975,784, entitled Accessory for Blow Torch, issued to Douglas J. Nelson on Mar. 21, 1961, teaches an accessory for use with a blow torch which is in the nature of a melting pot and includes a main body portion which holds fusible material such as lead. The accessory also includes a collar which slip over the barrel of the blow torch and mechanically couples the main body of the accessory to the barrel of the blow torch. The accessory is convenient because it is small enough so that it can be conveniently carried in a tool box and it is also universal so that it will mount on any blow torch. Furthermore it replaces all other heavy, cumbersome and expensive lead melting equipment and is a time saver.

U.S. Pat. No. 2,467,298, entitled Soldering Furnace, issued to Alva L. Dowers on Apr. 12, 1949, teaches an improved portable soldering furnace of the general type used by tinner. The improved portable soldering furnace includes a fuel tank, a combined filler and safety valve fitting on the fuel tank, a heater box which is adjacent to the tank and a soldering iron supporting plate on the heater box. The improved portable soldering furnace also includes a burner nozzle in the heater box extending therefrom below the plate, a tube which connects the burner nozzle to the fuel tank and an adjusting valve on the tube for controlling the flow of fuel therethrough, a second nozzle fitting connected in the tube adjacent to the fuel tank for attaching a blow torch nozzle. The improved portable soldering furnace further includes a fuel flow valve on the second nozzle fitting, fixed supporting members on the fuel tank and telescoping extensible supporting members on the heater box for supporting the furnace horizontally on an angular surface.

U.S. Pat. No. 4,119,088, entitled Soldering Irons, issued to Nigel L. Simm on Oct. 10, 1978, teaches a gas heated soldering iron which includes a soldering head which has a chamber into which a gas/air mixture is fed by means of a bunsen tube to burn as a small, very hot flame. The chamber is surrounded by a flame suppression gauze which protects the flame and prevents any combustible gases outside the chamber being ignited. Gas is supplied to the bunsen tube from a fine jet to which the gas is fed at low pressure. The low pressure is regulated by a valve operating mechanism which cooperates with the depressible valve of a disposable gas canister to form a differential valve. The canister serves as a handle for the soldering iron, and is insulated from the soldering head.

SUMMARY OF THE INVENTION

In view of the foregoing factors and conditions which are characteristic of the prior art it is a primary object of the present invention to provide an improved portable soldering furnace which has a heater chamber which is sufficiently insulated from a cylindrical bottle for holding a flammable gas under pressure so that the size of the improved portable soldering furnace may be relatively small.

It is another object of the present invention to provide an improved portable soldering furnace which can conveniently store not only the soldering iron, but also an acid jar, solder brushes and other supplies along with an insulated compartment for a propane gas bottle.

It is still another object of the present invention to provide an improved portable soldering furnace which has a heating unit which is able to direct its flame in order to heat the soldering iron.

It is still yet another object of the present invention to provide an improved portable soldering furnace which has a heater box which is disposed a pair of insulating chambers which allow air to circulate around the heater box and which does not provide a conduction path to the outside of the pair of insulating chambers.

In accordance with an embodiment of the present invention a heater box for use in combination with a heating unit in an improved portable soldering furnace is described. The soldering furnace includes a casing having a base and a hood which covers the base. The base has a first compartment wherein a soldering iron having a shaft, a handle and a soldering head; and a second compartment. The heating unit includes a cylindrical bottle, which holds a flammable gas under pressure, a valve, which is mechanically and fluidly coupled to the cylindrical bottle, and a burner tube, which is mechanically and fluidly coupled to the valve. The heating unit is disposed in the second compartment of the base. The heater box includes a heating chamber having a back wall, a bottom wall and a pair of side walls and being open at both its front and its top and it is disposed in the second compartment of the base and mechanically coupled to the heating unit. The heater box also includes an insulating apparatus for insulating the heating unit from the heating chamber. The insulating apparatus includes a first insulating chamber having a back wall, a pair of side walls, a top which is pivotally coupled to the pair of side walls adjacent to the back wall and a front wall which encloses the bottom half of the first insulating chamber and having the heating chamber disposed therein. The insulating apparatus also includes a second insulating chamber having a back wall, a pair of side walls and a front wall which partially encloses the front of the second insulating chamber and having the first insulating chamber disposed therein. The insulating apparatus further includes an insulating wall which is formed by two layers of metal with air gap between them and which insulates the cylindrical bottle from the second insulating chamber.

The features of the present invention which are believed to be novel are set forth with particularity in the appended claims.

Other objects and many of the attendant advantages of this invention will be more readily appreciated as the same becomes better understood by reference to the following detailed description and considered in connection with the accompanying drawing in which like reference symbols designate like parts throughout the figures.

The following disclosure and showing made in the drawing is to be considered only as an illustration of the present invention. The invention will be set forth with particularity in the appended claims.

DESCRIPTION OF THE PREFERRED EMBODIMENT

Figure 1:
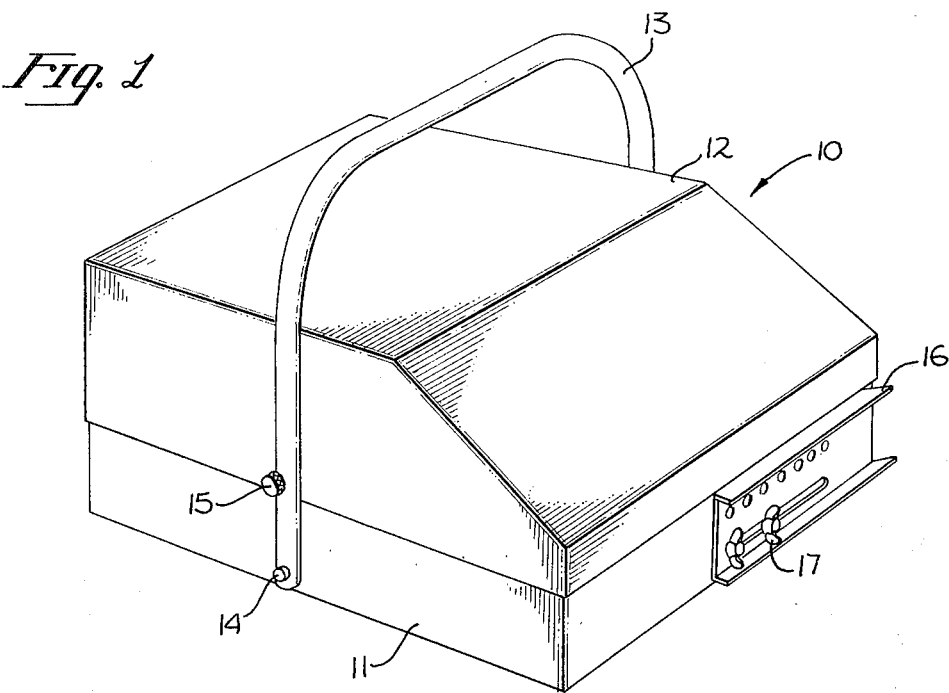
FIG. 1 is a perspective drawing of an improved portable soldering furnace which incorporates the principles of the present invention.

In order to best understand the present invention it is necessary to refer to a description of its preferred embodiment in conjunction with the accompanying drawing. Referring to FIG. 1 a casing 10 for the improved portable soldering furnace includes a base 11 and a hood 12. The casing 10 also includes a handle 13 which is pivotally coupled to the base 11 by a first pair of screws 14 and whose pivotal movement is restrained by a second pair of screws 15 which also fixedly couple the hood 12 to the base 11. The casing 10 further includes a sliding member 16 with a slot and a series of holes which are disposed in a line parallel to the slot. When the sliding member 16 is not in use it is secured to the casing 10 by a third pair of screw 17, which are spaced apart the same distance as the distance between the slot and the series of holes in the sliding member 16. The sliding member 16 may be used to maintain the base 11 in a horizontal position when the improved portable soldering furnace is being used on an angular surface.

Figure 2:
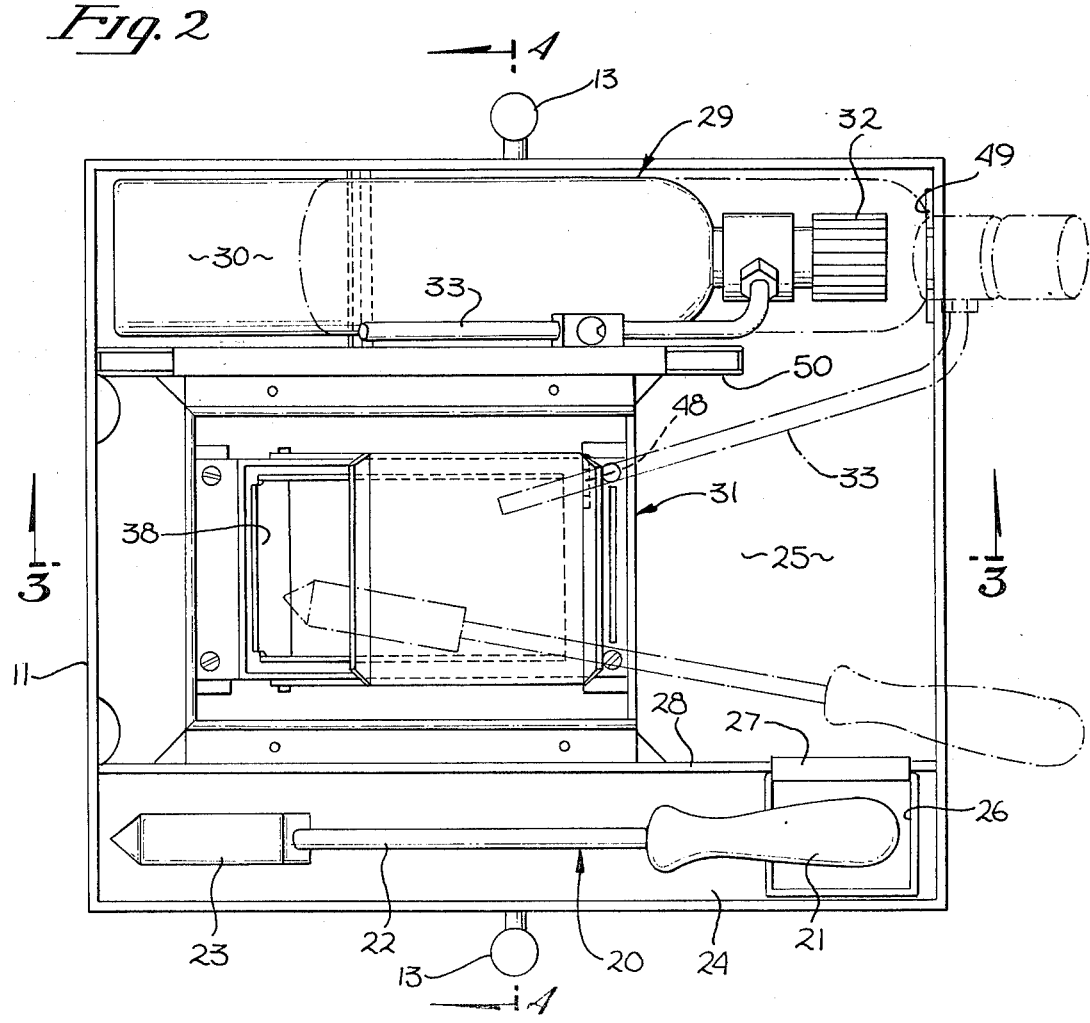
FIG. 2 is a top plan view of the improved portable soldering furnace of FIG. 1 without its top lid which encloses container in which the improved soldering furnace is disposed.

Referring to FIG. 2 the improved portable soldering furnace includes a soldering iron 20 having a handle 21, a shaft 22 and a soldering head 23. The base 11 includes a first compartment 24, which is long and narrow, and a second compartment 25, which is substantially wider than the first compartment 24 and equally as long. The soldering iron 20 may be stored in the first compartment 24 along with a supply of soldering material. The improved portable soldering furance also includes an open rectangular container 26 with a flange 27 by which is mechanically coupled to the sidewall 28 which separates the first compartment 24 from the second compartment 25. The open rectangular container 26 is used to hold the soldering flux and may be placed in either the first compartment 24 while the soldering iron 20 is in use or in the second compartment when the soldering iron 20 is being stored.

Still referring to FIG. 2 the improved portable soldering furnace further includes a heating unit 29 which includes a cylindrical bottle 30 for holding a flammable gas under pressure wherein the cylindrical bottle 30 is disposed with the second compartment 25 and a heater box 31. The heating unit 29 includes a valve 32, which U.S. Pat. No. 3,972,346 teaches, which is fluidly and mechanically coupled to the cylindrical bottle 30 and a burner tube 33, which U.S. Pat. No. 4,013,395 teaches, which is mechanically and fluidly coupled to the valve 32. The heater box 31 is disposed adjacent and mechanically coupled to the heating unit 29.

Figure 3:
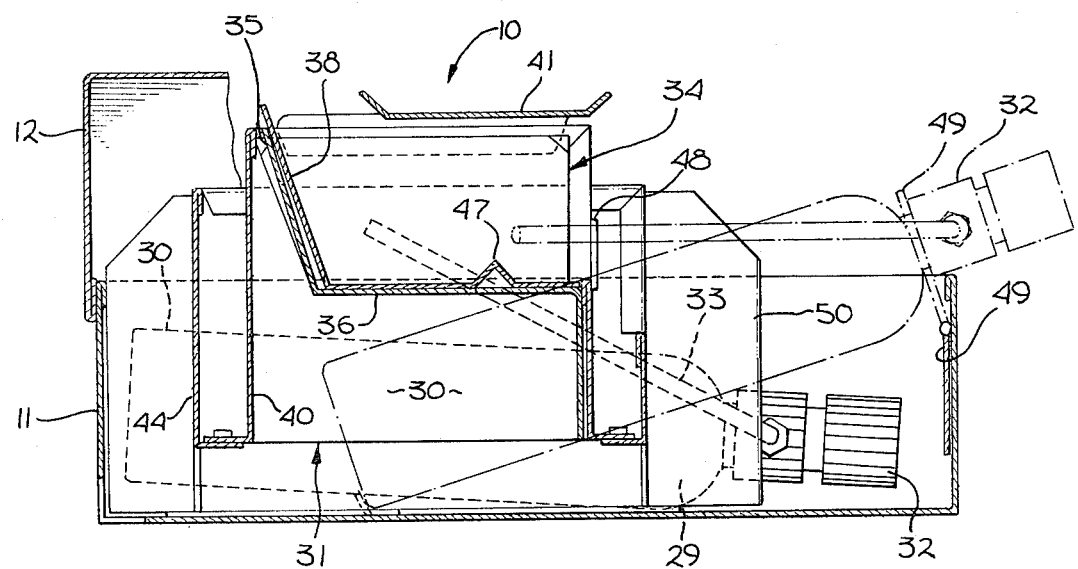
FIG. 3 is a side elevational cross-sectional view of the improved portable soldering furnace of FIG. 1 taken along line 3—3 of FIG. 2.

Referring to FIG. 3 in conjunction with FIG. 2 the heater box 31 includes a heating chamber 34 having a backwall 35, a bottom wall 36 and a pair of side walls 37 and being open at both its front and its top, an iron support plate 38 which is disposed within the heating chamber 34 and which also functions to reflect energy from the heating unit 29 onto the soldering head 23 of the soldering iron 20 and a first insulating chamber 39 which has a backwall 40, a pair of side walls 41, top which is pivotally coupled to the pair of side walls 41 adjacent to the back wall 39 and a front wall 42 which the bottom half of the first insulating chamber 39 and in which the heating chamber 34 is disposed. The heater box 31 also includes a second insulating chamber 43 which has a back wall 44, a pair of side walls 45 and a front wall 46, which partially encloses the front of the second insulating chamber, and in which the first insulating chamber 39 is disposed. The iron support plate 38 has a ridge 47 on which the soldering iron rests while the heating unit 29 heats its soldering head 23. The first insulating chamber 34 has a support member 48 for the burner tube 33 of the heating unit 29 in order to maintain the burner tube 33 in its proper position. The heating unit 29 also includes a bottle support plate 49 which is pivotally coupled to the front side wall of the base 11 by a hinge.

Figure 4:
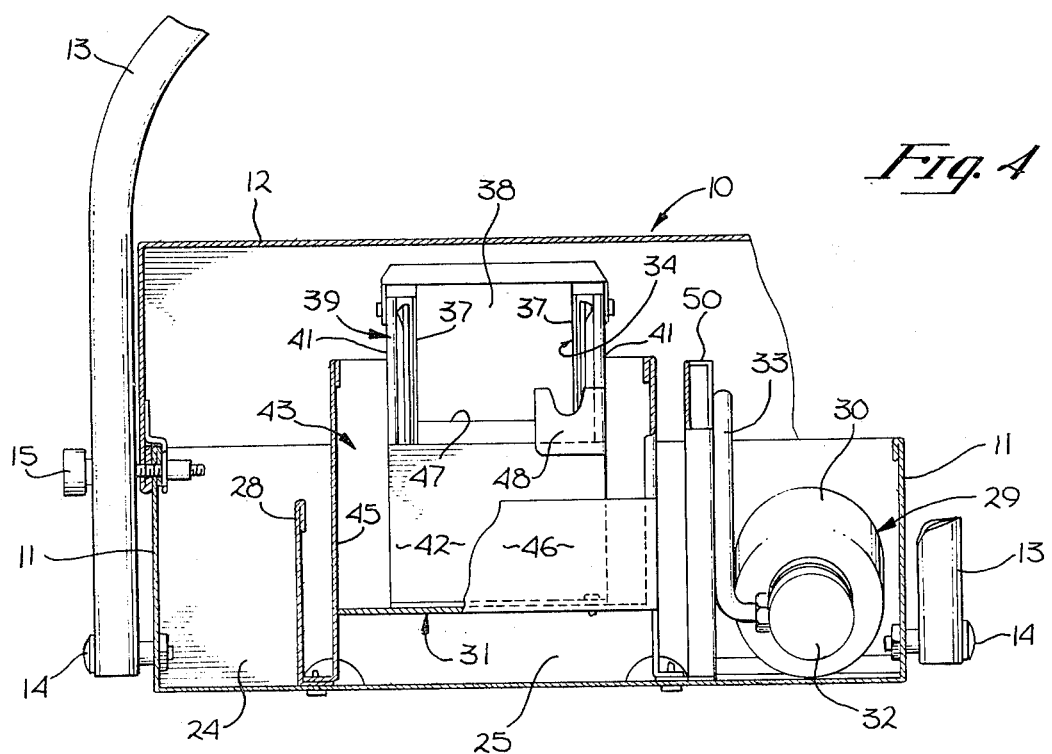
FIG. 4 is a front elevational cross-sectional view of the improved portable soldering furnace of FIG. 1 taken along the line 4—4 of FIG. 2.

Referring to FIG. 4 in conjunction with FIG. 2 the heater box 31 further includes an insulating wall 50 which is formed by two layers of metal with an air gap between them and which is disposed between the cylindrical bottle 30 and the second insulating chamber 43 in order to prevent the cylindrical bottle from overheating.

U.S. Pat. No. 3,972,346, entitled Pressure Regulator, issued to Alex F. Wormser on Aug. 3, 1976, teaches a pressure regulator which may be used in the preferred embodiment of the heating unit. U.S. Pat. No. 4,013,395, entitled Aerodynamic Fuel Combustor, issued to Alex F. Wormser on Mar. 22, 1977, teaches a fuel burner which also may be used in the preferred embodiment of the present invention.

Among the advantages of the present invention are that all of the equipment necessary for soldering is contained in a single, portable unit. Furthermore it should be noted that the schematics of the improved portable soldering furnace have not been drawn to scale and that distances of and between the figures are not to be considered significant.

Accordingly, it is intended that the foregoing disclosure and showings made in the drawing shall be considered as illustrations of the principles of the present invention.

What is claimed is:

1. A heater box for use in combination with a heating unit in an improved portable soldering furnace which includes:
   a. a casing having a base and a hood which covers the base, the base having a first compartment, which is long and narrow, and a second compartment, which is also long, but which is substantially wider than the first compartment wherein a soldering iron having a shaft, a handle and a soldering head may be disposed in the first compartment; and
   b. a heating unit which is disposed in the second compartment and which heats the soldering head of the soldering iron, said heater box comprising:
      a. a heating chamber having a back wall, a bottom wall and a pair of side walls and being open at both its front and its top, said heating chamber having means for being mechanically coupled to the heating unit and being disposed in the second compartment of the base; and
      b. insulating means for insulating the heating unit from said heating chamber being disposed in the second compartment of the base.

2. A heater box according to claim 1 wherein said insulating means comprises a first insulating chamber having a back wall, a pair of side walls, a top which is pivotally coupled to said pair of side walls adjacent to said back wall and a front wall which encloses the bottom half of said first insulating chamber and having said heater chamber disposed therein.

3. A heater box according to claim 2 wherein said insulating means also comprises a second insulating chamber having a back wall, a pair of side walls and a front wall which partially encloses the front of said second insulating chamber and having said first insulating chamber disposed therein.

4. A heater box according to claim 3 wherein the heating unit includes a cylindrical bottle for holding a flammable gas under pressure, a valve which is mechanically and fluidly coupled to the cylindrical bottle and has a burner tube which can be mechanically coupled to and disposed within said heating chamber in order to heat the soldering head of the soldering iron.

5. A heater box according to claim 4 wherein said insulating means further comprises an insulating wall which is formed by two layers of metal with an air gap between them and which is disposed between said second insulating chamber and the cylindrical bottle of the heating unit.

6. A heater box according to claim 5 wherein said first insulating chamber has a support member for the burner tube of the heating unit in order to maintain the burner tube in its proper position and wherein said heating chamber also comprises an iron support plate having a ridge on which the soldering iron rests while the heating unit heats the soldering head of the soldering iron.

* * * * *